F. F. BRUSH.
BLOCK SIGNALING SYSTEM.
APPLICATION FILED AUG. 26, 1907.
939,973.
Patented Nov. 16, 1909.
4 SHEETS—SHEET 1.
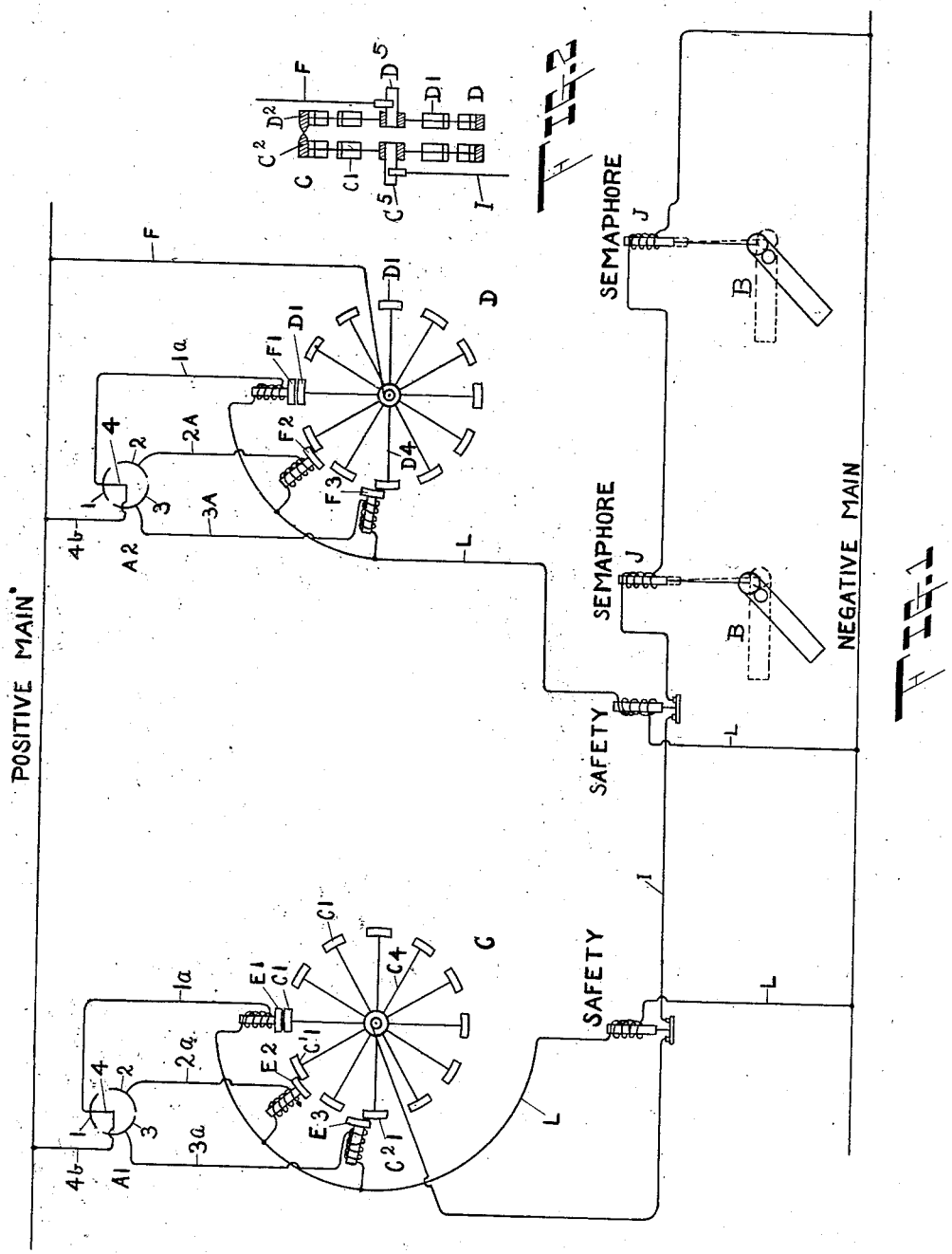
WITNESSES:
J. Ray Abbey
Ralph S. Warfield
INVENTOR
Frederick F. Brush
BY
Geo. B. Willcox
ATTORNEY

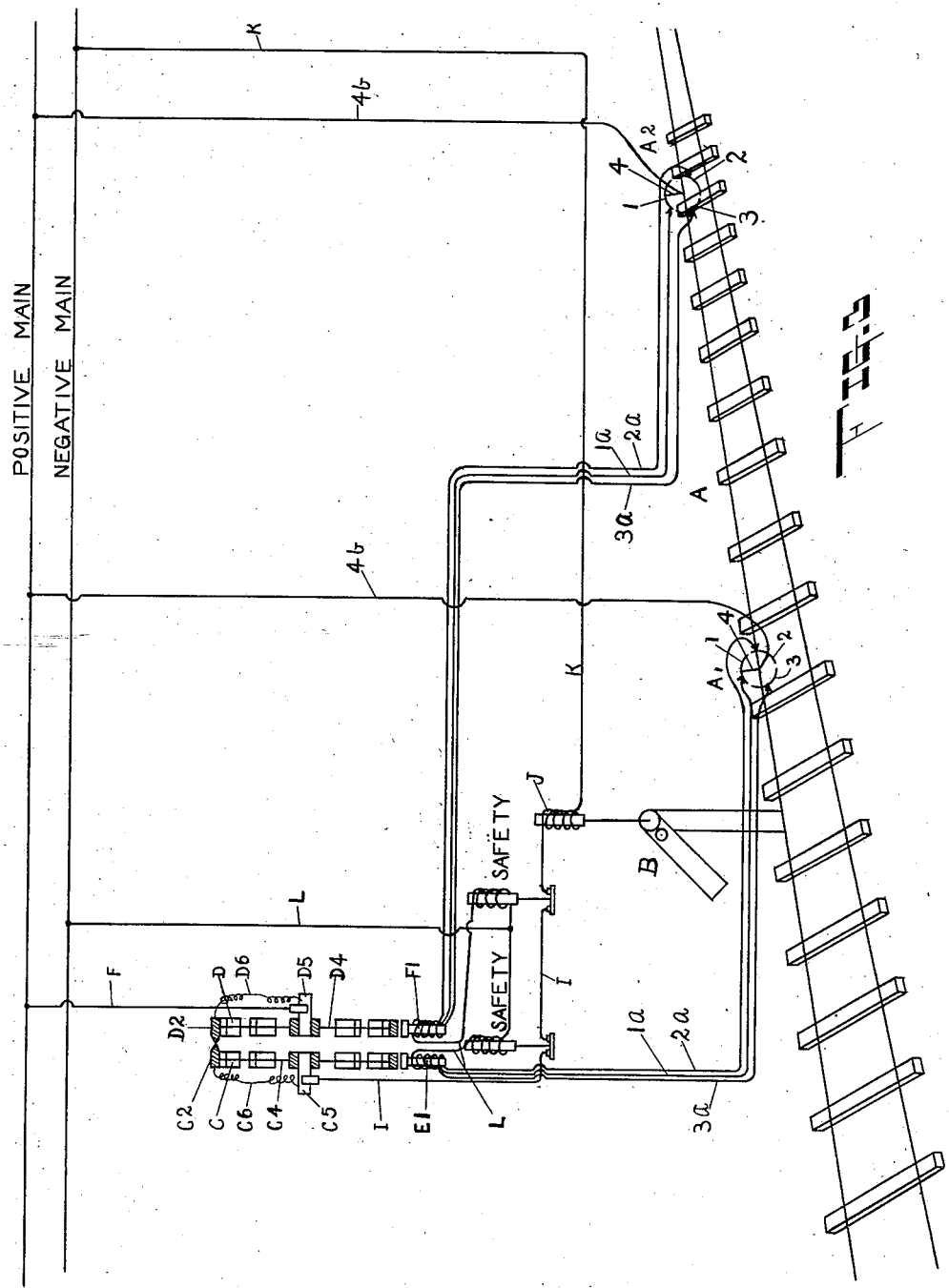

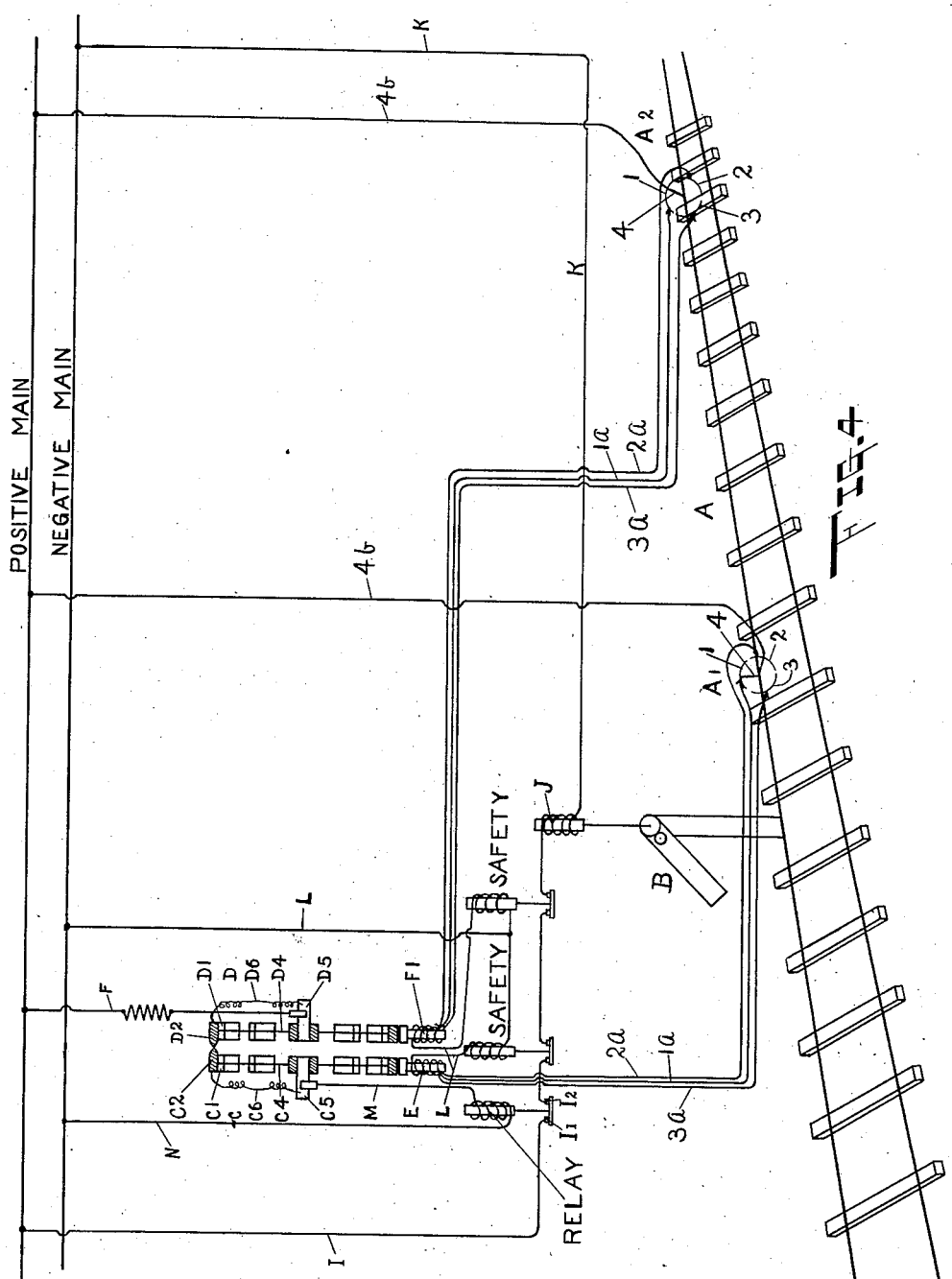

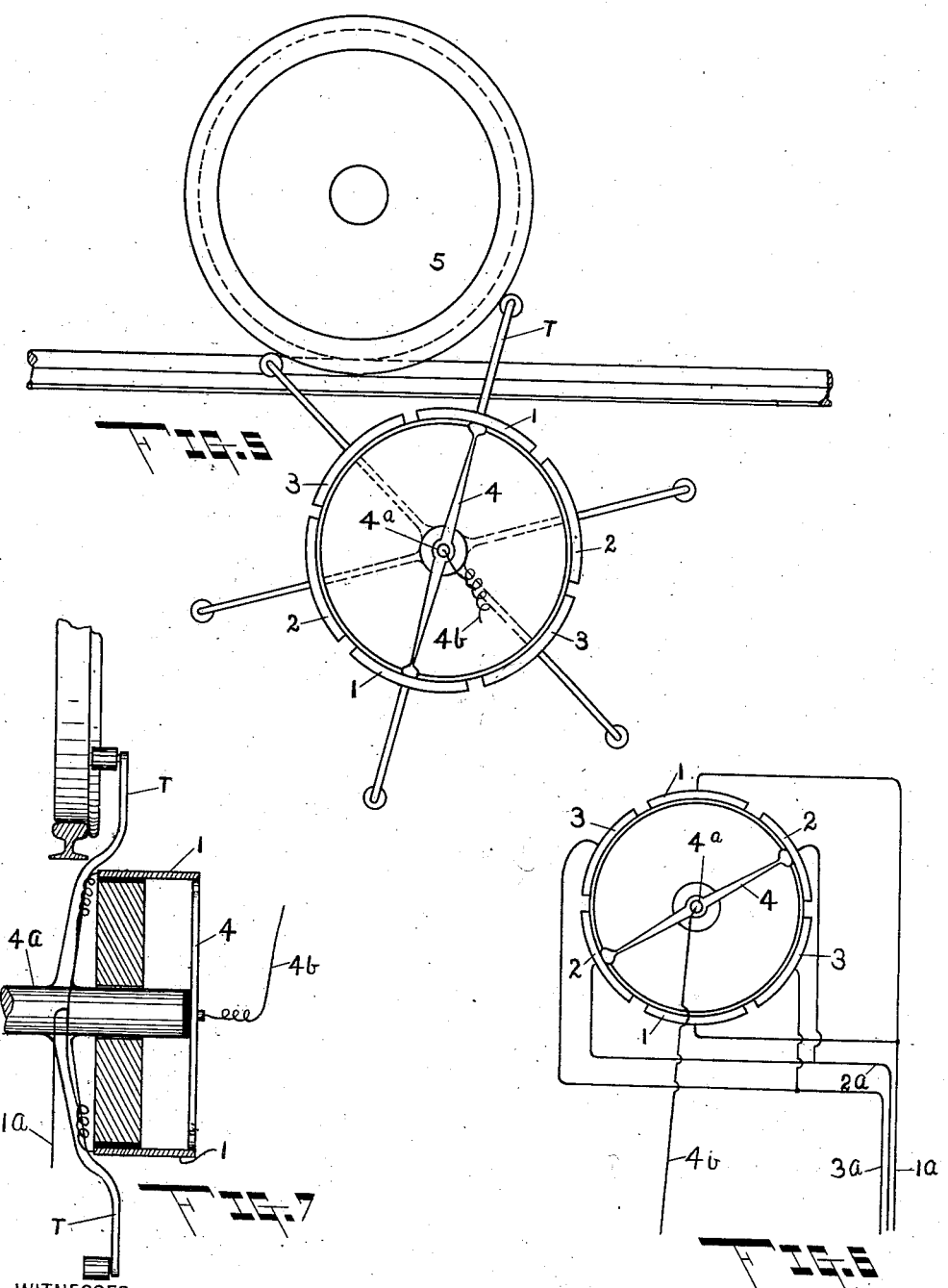

UNITED STATES PATENT OFFICE.

FREDERICK F. BRUSH, OF DETROIT, MICHIGAN.

BLOCK-SIGNALING SYSTEM.

939,973.

Specification of Letters Patent. Patented Nov. 16, 1909.

Application filed August 26, 1907. Serial No. 390,169.

*To all whom it may concern:*

Be it known that I, FREDERICK F. BRUSH, a citizen of the United States, residing at Detroit, in the county of Wayne and State of Michigan, have invented certain new and useful Improvements in Block - Signaling Systems; and I do hereby declare the following to be a full, clear, and exact description of the invention, such as will enable others skilled in the art to which it appertains to make and use the same.

This invention relates to electrically-actuated signaling apparatus for railways and is especially adapted to block signal systems in which a section of track,— commonly known as a block,—of any desired length is protected by semaphores or other signals located near its ends.

My invention pertains more particularly to that class of block-systems in which there is provided near each semaphore, a tripping device actuated by wheels of passing trains, whereby each wheel entering the block is counted or recorded on a recording mechanism located at any convenient place. It is usual in such systems to employ two tripping devices, one at each end of a block and so arrange them that a movement of either will so actuate the recorder that all wheels entering the block are recorded by successive step-by-step movements of the recorder in one direction—and all wheels leaving the block are recorded by a step-by-step movement of the recorder in the opposite direction. The function of the recorder is to so control the semaphores of the block in which the recorder is located that they will indicate danger when the recorder indicates that car wheels are in the block, and safe when the block is clear. It is common in such systems to actuate the recorder that produces the step-by-step movements by means of electrically-actuated pawl-and-ratchet devices of various constructions. In practice such pawl-and-ratchet recording devices, while perhaps reasonably satisfactory when trains enter and leave the block at slow speed, are not sufficiently quick in their operation by reason of inertia of the parts, to properly record wheels entering the block and leaving the block at high speed. Another practical disadvantage of ratchet-and-pawl recording devices is that they necessitate a large number of small and delicate parts liable to get out of order or be improperly adjusted.

To overcome the disadvantages of the ratchet-and-pawl recorder, and to attain other advantages in a railroad signaling system which will be pointed out further, I have devised the system illustrated in the accompanying drawings and set forth in the specification and claims.

In the drawings, Figure 1 is a diagrammatic view illustrating an arrangement of circuits adapted to my invention. Fig. 2 is a sectional view of the counter. Fig. 3 is a diagrammatic view of the circuits, as applied to a railway block. Fig. 4 is a similar view showing the arrangement of circuits when a relay is employed to open and close the semaphore circuit. Fig. 5 is a side view of the tripping device applied to the track. Fig. 6 is a diagram of the tripping device circuits. Fig. 7 is a central vertical section of the tripping device.

An installation embodying my improvement, in so far as it applies to a single block, consists in one or more semaphores located at one or both ends of the block, the semaphores being electrically connected. Track devices, which I will term hereafter "tripping devices", located along the rails at suitable positions in reference to each semaphore, are adapted to be tripped or moved one step by each wheel of a passing train, and the tripping devices cause an electrically-operated counter or recorder located at any suitable point to record the passage of each wheel in either direction, whether into the block or out of it. The recording device, which is an important feature of my invention, is so constructed that wheels passing into the block are recorded in a manner which for the purposes of description, may be designated as "positive", and wheels leaving the block are recorded in a manner that may be designated as "negative". When the block is clear, the recording device is in what may be termed its "zero" or "safe" position, in which position electric contacts are so maintained through the recording device that the current continuously traverses the magnets of the semaphores to cause them to indicate that the block is clear. Entrance of a single car wheel into the block moves the tripping device one step, the effect of which is to move the recording device one step, thereby breaking the circuit through the semaphores, causing them to be dropped by gravity to indicate "danger" When the car wheel leaves the block the recording device is, in like manner, restored to a zero position, causing the semaphores to again indicate that the block is clear.

To set forth more in detail the construction and operation of my improved system, I have shown in Figs. 3 and 4 a section of track embracing a single block (A), at the ends of which are located the tripping devices (A¹) and (A²). These tripping devices may be of any suitable form adapted to make electrical contacts whereby the required movements of the recording apparatus will be produced and the semaphores operated; but for the purpose of illustration, I have shown one embodiment of such a tripping device in Figs. 5, 6 and 7.

The construction and operation of the tripping device will now be explained. It consists of six segments, more or less,—Fig. 6,—connected in pairs (1), (2), (3), around which sweeps a commutating arm (4) pivoted at the center of the segments. The device is provided with tripping arms (T) fixed to a rotatable shaft (4ª) and so arranged that the passage of one car wheel will move the commutating arm (4) from one segment or pair of segments to the next, the direction of movement of the arm depending upon the direction in which the car wheel (5) passes the tripper. If the wheel passes into the block, the arm will move, say toward the right to the segments (2), Figs. 5 and 6, while if the wheel passes in the opposite direction, the arm will move toward the left to segments (3).

If a number of wheels pass into the block, the arm (4) will rotate to the right one segment for each wheel entering the block, making a complete revolution for each six wheels. On the other hand, if the wheels are leaving the block, the rotation of the arm will be in the opposite or left hand direction. Thus it will be observed that I have devised a track instrument capable of making a complete rotation step-by-step in one direction or the other depending upon the direction of movement of the train, being positively engaged by the wheels of a passing train. This construction is in practice found to be much superior to the oscillating or reciprocating track instruments which often clog or stick because of ice forming around them or because extraneous material pressed in by the wheels prevents their movement.

The track circuit is as follows—The revolving arm (4) of the tripping device is connected by a wire (4ᵇ) to the positive main and each segment or pair of segments is connected respectively by wires (1ª), (2ª), (3ª), to one of the magnets that actuate the recording device.

The recording or contact carrying make-and-break device consists essentially in two rotatable members (C) (D), which may be designated as rotors. These rotors may be of any suitable form, but I prefer in practice to make them of a number of small individual magnetic armatures $(C^1)$, $(D^1)$, arranged in a circle—Fig. 1. They may be attached to a circular disk of non-magnetic material or arranged as shown in the drawings, on the ends of radially extending non-magnetic spokes $(C^4)$, $(D^4)$.

The recorder consists essentially in two rotors (C), (D), arranged face to face on independent axes $(C^5)$, $(D^5)$, as shown in Figs. 2, 3 and 4. Oppositely-placed contact points $(C^2)$, $(D^2)$, electrically connected by wires $(C^6)$, $(D^6)$, to the shafts $(C^5)$, $(D^5)$, on which the rotors are mounted, form the means by which the semaphore-actuating current is established when the contact points meet.

The semaphore-circuit,—Fig. 3,—is as follows:—from the positive main, through wire (F), shaft $(D^5)$, wire $(D^6)$, contact points $(D^2)$, $(C^2)$, wire $(C^6)$, shaft $(C^5)$, wire (I), semaphore-actuating magnet (J), and wire (K) to the negative main.

If either rotor (C) or rotor (D) is moved relatively to the other, the semaphore current is broken and the semaphores indicate "danger".

Proper movement of the rotors, without the employment of ratchets, pawls, or like parts, the inertia of which would prevent accurately recording wheels passing at high speeds, necessitates electrical means for rotating either rotor in either direction with a step-by-step movement. The means by which I produce the step-by-step movement of the rotors, is as follows—A plurality of electro-magnets $(E^1)$, $(E^2)$, $(E^3)$, and $(F^1)$, $(F^2)$, $(F^3)$,—Fig. 1,—adapted to register successively with the individual armatures $(C^1)$, $(D^1)$, are arranged around the circumference of each rotor. The relative position of the magnets and the armatures is always such that when one armature is directly opposite to any one of these magnets, another armature is in position to be drawn into register with another magnet by a single step-movement of the armature, in say a left-hand direction, while a third armature is in position ready to be drawn into register with the third magnet by a single step-movement of its armature in the opposite or right-hand direction. If the first magnet $(E^1)$,—Fig. 1,—which is shown in full register with its armature $(C^1)$ is demagnetized and the second magnet $(E^2)$ becomes magnetized, there will be produced a single-step movement of the armature $(C^{1\prime})$ and the rotor in a left-hand direction. On the other hand, if the third magnet $(E^3)$ becomes magnetized, there will be a movement of the armature $(C^21)$ and the rotor in the opposite or right-hand direction. It follows, therefore, that this arrangement of the magnets relative to the individual armatures on the rotors is such that a single-step movement of the rotor in either direction may always be obtained by de-magnetizing one of the magnets and magnetizing either of the remaining magnets, the direction of motion of the armature depending upon which of the magnets receives the current. A single step movement, such as I have just described, may be repeated in either direction an indefinite number of times, by successively energizing these magnets in the manner described.

It will be understood from the above description that each of the two opposing rotors (C), (D), is equipped with a corresponding set of three or more electro-magnets, the rotation of each armature, both in direction and amount, depending upon the manner in which its magnets are energized. One set of magnets,—say those that register with rotor (C),—are actuated by the tripping device at one end of the block, as (A'), while the magnets that register with armature (D) are actuated by the tripping device at the opposite end of the block, each rotor being actuated by its corresponding tripper.

The making and breaking of the semaphore circuit is accomplished in the following manner, reference being had to Figs. 1 and 3. Under normal or "safe" condition of the block, a continuous current flows from the positive main through each of the wires (4$^b$), arms (4), of the respective tripping devices (A$^1$) and (A$^2$), and from the arm (4) through that one of the segment pairs (1), (2) or (3) that happens to be in contact with arm (4),—say (1), and thence through wire (1$^a$), to magnet (E$^1$) of the recording device, thence through wire (L) to the negative main. When a car wheel passes either tripping device, say (A$^1$), moving its arm (4) one step in either direction,—say to the right, to segment (2),—the continuous current still flows from the positive main via wire (4$^b$) and the arm (4) of the tripping device, but it now reaches the recorder by a different path,—viz., segment (2) and wire (2$^a$). The effect of the diversion of current is to actuate one of the contact points (C$^2$) of the recording device one step in the positive direction, thereby interrupting the semaphore circuit and causing the semaphore to indicate "danger". For further illustration we will assume that a single wheel has entered the block and that the recording device has moved one step in the positive direction, as above described, showing "danger" at the semaphore (B). If now the wheel leaves the block by backing out, passing over tripping device (A$^1$) in the reverse direction, it thereby restores the recorder contact point (C$^2$) to its original position, and reëstablishes the semaphore circut, bringing the semaphores to "safe". If, on the other hand, the wheel instead of backing out, runs through the block and leaves it by running over tripping device (A$^2$), this tripping device moves one step to the right, actuating the contact point (D$^2$) of the recording device one step in the negative direction, thereby bringing (D$^2$) into contact with (C$^2$), reëstablishing the semaphore circuits and causing them to indicate "safe".

It is evident from the above description that when one or more wheels enter the block, the semaphores indicate "danger" and when the same number of wheels leave the block, in either direction,—the semaphores show "safe".

The actual semaphore circuit, was in the above illustration, assumed to be broken directly by the contact points of the recording device, and under some conditions this arrangement is practicable. I prefer, however, to make and break the main semaphore current, which in practice, may be one of considerable strength, not directly, as above described, but by means of a relay-actuated-make-and-break device, illustrated in Fig. 4. The relay may be actuated by a local weak current that passes from the positive main wire (F), through the recording device, and contact points (D$^2$) (C$^2$), wire (M) through the relay and thence by wire (N) to the negative main. The semaphore circuit meanwhile flows from the positive main through wire (I), relay-controlled contacts (I$^1$) and (I$^2$), semaphore magnet (J) and wire (K) to the negative main. The relay is adapted to maintain connection across points (I$^1$) (I$^2$) so long as the relay is energized. A break in the relay circuit, as by moving one of the contact points (C$^2$) (D$^2$) deënergizes the relay and breaks the contact (I$^1$ (I$^2$) and the semaphore circuit.

In case the circuit through one of the tripping devices or the semaphore circuit becomes deranged, it is advisable to automatically cause the semaphores to indicate "danger". To this end, I connect the three magnet coils (E$^1$), (E$^2$), (E$^3$), (F$^1$), (F$^2$), (F$^3$) of each armature together by wire (L) leading to the negative main. In the wire (L), I provide a "safety" relay which normally holds the semaphore circuit closed. In the event of an open circuit in either tripping device or in either rotor, or in the wires connecting them, the corresponding "safety" relay will be deënergized and will break the semaphore circuit causing the semaphores to indicate "danger".

While I have shown and described a single recording apparatus and its relay as applied to a single block, it is to be understood that a plurality of such apparatus connected in series, may be employed in a single block, if desired.

Having thus fully disclosed my invention, what I claim as new is—

1. In a block signal system, the combination with a railway block having electrically-actuated semaphores, a positive and a negative main, a conductor from the positive main to the semaphore, a conductor from the semaphore to the negative main, and means for interrupting the current through said semaphore, said means comprising a pair of oppositely placed electrically-actuated rotors carrying contact points adapted to maintain the semaphore current when the contact points are in engagement and to interrupt the current when they are out of engagement; means for actuating said rotors comprising a plurality of armatures on each of said rotors, electro-magnets arranged around the periphery of each rotor adapted to attract said armatures, together with means for selectively energizing one of said magnets and deënergizing the others, said means comprising a plurality of contact segments, each connected to one of said magnets, and means adapted to be actuated by the wheels of a passing train for establishing electrical current through one of said segments and its corresponding magnet.

2. In a block signal system, the combination with a railway block having electrically actuated signals, a positive and a negative main, of a signal circuit leading from the positive to the negative main and including the signal, means for interrupting the signal circuit, said means comprising a pair of oppositely placed electrically actuated rotors, contact points carried by the rotors, the contact points adapted to maintain the signal current only when in engagement with each other, individual electrically energized means for actuating either rotor step-by-step in either direction, and a wheel actuated track device for selectively energizing any individual means.

3. In a block signal system, the combination with a railway block having electrically actuated signals, a positive and a negative main, of a signal circuit leading from the positive to the negative main, and including the signal, means for interrupting the signal circuit, said means comprising a pair of oppositely placed electrically actuated rotors, contact points carried by the rotors, the contact points adapted to maintain the signal circuit only when in engagement with each other, electrically energized means for actuating either rotor in either direction independently of the remaining rotor, and a wheel-actuated track device for effecting the selective energization of the rotor actuating means.

4. In a block signal system, the combination with a railway block having electrically-actuated semaphores, a positive and a negative main, a conductor from the positive main to the semaphore, a conductor from the semaphore to the negative main, and means for interrupting the current through said semaphore, said means comprising a pair of oppositely placed electrically-actuated rotors carrying contact points adapted to maintain the semaphore current when the contact points are in engagement and to interrupt the current when they are out of engagement; armatures carried by the rotors, electro-magnets arranged around the periphery of each rotor adapted to attract said armatures, together with means for selectively energizing one of said magnets and deënergizing the others.

5. In a block signal system, the combination with a railway block having electrically actuated signals, a positive and a negative main, of a signal circuit leading from the positive to the negative main and including the signal, means for interrupting the signal circuit, said means comprising a pair of oppositely placed electrically actuated rotors, contact points carried by the rotors, the contact points adapted to maintain the signal circuit only when in engagement with each other, individual electrically energized means for actuating either rotor step-by-step in either direction and a wheel actuated track device for selectively energizing any individual means, the track device comprising a plurality of contact segments, each connected to an individual rotor actuating means and an arm actuated by the wheels of a passing train for establishing a circuit through any one of the segments and the rotor actuating means.

6. In a block signal system, the combination with a railway block having electrically actuated signals, a positive and a negative main, of a signal circuit leading from the positive to the negative main and including the signal, means for interrupting the signal circuit, said means comprising a pair of oppositely-placed electrically-actuated rotors, contact points carried by the rotors, the contact points adapted to maintain the signal circuit only when in engagement with each other, individual electrically-energized means for actuating either rotor step-by-step in either direction, and a wheel-actuated track device for selectively energizing any individual means, the track device comprising a plurality of contact segments singly-connected to the respective rotor actuating means, a conductor leading from the individual rotor-actuating means to the negative main, a wheel-actuated commutator arm engaging the respective segments and a conductor leading from the positive main to the commutator arm.

7. A block signal system comprising a pair of contact points, one at least of which is movable relative to the other, the contact points normally lying in engagement, a signal, a suitable source of electrical energy, means for actuating the signal, a main circuit leading from the source through the contact points to the signal-actuating means and thence returning to the source, a track device, electrically-energized means for actuating one contact point relative to the other, and a second circuit leading from the source to the track device, thence to the contact actuating means and thence returning to the source.

8. A block signal system comprising a signal, a source of electricity, a main circuit leading from the source through the signal and thence returning to the source, a tripping, wheel-actuated device, a second circuit communicating with and controlled by the tripping device, and electro-mechanical means energized by said second circuit for breaking and making the first named circuit.

9. A block signal system comprising a signal, electrically-operated means for actuating the signal, a source of electricity with which the signal actuating means is in circuit, a make-and-break contact device also included in the circuit, a second circuit, electrically-energized means controlling the make-and-break device, and a track device both in said second circuit, the track device controlling the second circuit to actuate the make-and-break controlling means.

10. A block signal system comprising a signal, an electrically-energized means for operating the signal, independently movable contact-carrying rotors, the contacts normally lying in engagement, a circuit including the rotors and a signal-operating means, a track device, a commutator actuated thereby, electrically-energized means for actuating the respective rotors relative to each other, and a second circuit including the commutator and electrically energized rotor-actuating means, the movement of the commutator controlling the electrically energized rotor-actuating means and effecting the making and breaking of the first named circuit.

11. A block signal system comprising an electro-mechanically actuated signal, a contact-carrying make-and-break device, a main circuit including the signal and make-and-break device, electrically energized means for actuating the make-and-break device, a second circuit including the make-and-break actuating means, a tripping device in the second circuit for controlling the energization of the make-and-break actuating means, and a circuit breaker in the main circuit controlled by the second circuit.

12. A block signal system comprising an electrically-actuated signal, a contact-carrying make-and-break device, a main circuit for actuating the signal, a relay normally closing the main circuit, a secondary circuit including the relay and controlled by the contact make-and-break device, electrically-actuated means for operating the contact-carrying make-and-break device, a wheel-operated commutator and a track circuit controlled by the commutator and adapted to selectively energize the electrically actuated means for operating the contact make-and-break device.

13. A block signaling system comprising a signal, electrically-energized means for actuating the signal, a pair of rotors, contact points carried by the rotors, electrically energized means for actuating the rotors independently of each other in either direction, a pair of track devices located apart from each other, and a pair of track circuits including the respective rotor-actuating means and the track devices, the latter controlling the energization of the rotor-actuating means.

14. A block signal system comprising an electrically actuated signal, a pair of rotors, a contact carried by each rotor, the contacts normally in engagement with each other, the rotors capable of movement independently of each other in either direction, a series of electro-magnets for each rotor, the magnets so arranged relative to the respective rotors that the energization of one or another will move its rotor one step in one direction or the other, a main circuit leading from a suitable electrical source through the contact points of the rotors, thence to the electrically actuated signal and returning to its source, safety make-and-break contacts located in the circuit between the rotors and the signal, track devices for each rotor, commutators, the respective sections of each commutator being electrically connected to the respective electro-magnets of its rotor, a commutator arm actuated by its track device, track circuits connecting the respective commutator arms and the respective electro-magnets to a source of electricity, and magnets for actuating the safety make-and-break contacts in the first circuit, the second-named circuits including the respective contact-actuating magnets.

15. A block signaling system comprising an electrically-actuated signal, a pair of rotors, a contact carried by each rotor, the contacts normally in engagement with each other, the rotors capable of movement independently of each other in either direction, a series of electro-magnets for each rotor, the magnets so arranged relative to the respective rotors that the energization of one or other will move its rotor one step in one direction or the other, a main circuit leading from a suitable electrical source through the contact points of the rotors, thence to the electrically-actuated signal and returning to its source, track devices for each rotor, commutators, the respective sections of each commutator being electrically connected to the respective electro-magnets of its rotor, commutator arms actuated by the respective track devices, and track circuits connecting the respective commutator arms and the respective electro-magnets to a source of electricity.

16. A block signal system comprising an electrically actuated signal, a pair of rotors, a contact carried by each rotor, the contacts normally in engagement with each other, the rotors capable of movement in either direction relative to each other, separate electrically energized means for each rotor adapted to impart a step-by-step movement thereto in either direction either successively or alternately for actuating either rotor in either direction, commutators, the respective sections of which are electrically connected with the respective rotor-actuating means, a wheel-actuated commutator arm for each commutator, the arms being in electrical connection with an electrical source, whereby the rotor-actuating means are selectively energized, and a main circuit completed through the rotor-carried contacts and adapted to actuate the signal, the respective rotor-actuating means being connected to the same source of electrical energy as are the arms of the respective commutators.

17. A block signal system comprising a pair of wheel-actuated commutator arms, connected to an electrical source, commutators swept by the arms, a pair of rotors, separate electrically - energized means for actuating each rotor, the respective sections of each commutator being separately connected to the respective elements of its rotor-actuating means to permit a selective energization thereof, wires leading to an electrical source with which wires the respective elements of the rotor actuating means are connected in series, a signal, electrically energized means for operating the signal, a contact carried by each rotor, the contacts normally in engagement, and a main circuit completed through the contacts and including the signal operating means.

18. In a block signal system, the combination with a railway block having electrically-actuated semaphores, a positive and a negative main, a conductor from the positive main to the semaphore, a conductor from the semaphore to the negative main, and means for interrupting the current through said semaphore, said means comprising a pair of oppositely placed individually movable rotors carrying contact points adapted to maintain the semaphore current when the contact points are in engagement and to interrupt the current when they are out of engagement, and means for actuating said rotors through the influence of magnetic force applied directly thereto.

19. A block signal system comprising an electrically actuated semaphore mechanism, an electric circuit including the semaphore mechanism, and means for interrupting the current through the semaphore mechanism, such means comprising a pair of opposed rotors, individually movable in either direction, means for actuating the rotors directly through magnetic attraction, and contact points carried by the respective opposed rotors, the contact points adapted to engage at any point throughout the cycle of rotation to complete the circuit.

20. A signal system comprising a signal, means for actuating the signal, an electric circuit for energizing the signal actuating means, and means for interrupting the current through the signal actuating means, such current interrupting means comprising a pair of rotors individually movable independently in either direction, the rotors being actuated directly by the application of magnetic attraction, and contact points carried by the rotors and adapted to engage at any point throughout the cycle of rotation to complete the circuit.

21. In a signal system, the combination with at least one electrically actuated signal mechanism, of a positive and a negative main, a conductor from the positive main to the signal mechanism, a conductor from the signal mechanism to the negative main, means for interrupting the current through the signal mechanism, said means comprising a pair of electrically-actuated rotors carrying contact points adapted to maintain the current when the contact points are in engagement and to interrupt the current when they are out of engagement, means for actuating said rotors comprising a plurality of armatures on each of said rotors, electro-magnets arranged around the periphery of each rotor and adapted to attract said armatures, and means for selectively energizing any one of said magnets and deënergizing the remainder, said means comprising a plurality of contact segments, each connected to one of said magnets, and means actuated in any suitable manner for establishing an electrical current through one of said segments and its corresponding magnet.

22. A signal system comprising at least one electrically-actuated signal mechanism, a circuit including the signal mechanism, means for interrupting the circuit, said means comprising a pair of electrically-actuated rotors, contact points carried by the rotors, the contact points adapted to engage each other to maintain the current, individual electrically-energized means for actuating either rotor step-by-step in either direction, and a commutator for selectively energizing any one of the individual rotor-actuating means.

23. A signal system comprising at least one electrically-actuated signal mechanism, a circuit including the signal mechanism, means for interrupting the current through the circuit, said means comprising a pair of electrically-actuated rotors, contact points carried by the rotors and adapted to maintain the current when the contact points are in engagement and to interrupt the current when they are out of engagement, armatures carried by the rotors, electro-magnets arranged around the periphery of each rotor and adapted to attract the armatures, and means for selectively energizing any one of the magnets and deënergizing the remainder.

24. A signal system comprising an electrically-actuated signal mechanism, a circuit including the signal mechanism, means for interrupting the circuit, said means comprising a pair of rotors, contact points carried by the respective rotors and normally lying in engagement with each other to maintain the circuit, electrically energized means for actuating one rotor relative to the other to break the circuit, and means for selectively energizing the rotor-actuating means.

25. A signal system comprising a signal, electrically-energized means for actuating the signal, a pair of rotors, contact points carried by the respective rotors, electrically-energized means for actuating the rotors independently of each other in either direction, and means for electrically energizing the rotor-actuating means.

26. A signal system comprising an electrical circuit, a signal mechanism and a pair of rotors in the circuit, contact points carried by the rotors, the contact points normally in engagement with each other to maintain the circuit, the rotors capable of movement independently of each other in either direction, a series of electro-magnets for each rotor, the magnets so arranged relative to the peripheries of the rotors that the energization of one or the other of the magnets will move its rotor in one direction or the other, and means for energizing the electro-magnets.

27. A signal system comprising an electrical circuit, a signal mechanism in the circuit, and means for interrupting the signal circuit, said means comprising a pair of oppositely placed individually movable rotors carrying contact points adapted to maintain the signal circuit when in engagement and to interrupt the circuit when out of engagement, and means for actuating said rotors through the influence of magnetic force applied directly thereto.

In testimony whereof, I affix my signature in presence of two witnesses.

FREDERICK F. BRUSH.

Witnesses:
 ALFRED BUNCLARK,
 NELLIE M. ANGUS.